3,825,616
TREATING ALKYLATE-CONTAINING HYDRO-
CARBON WITH HF IN A UNITARY VESSEL
Charles C. Chapman, Bartlesville, Okla., assignor to
Phillips Petroleum Company
Filed Sept. 3, 1971, Ser. No. 177,586
Int. Cl. C07c 3/54
U.S. Cl. 260—683.48           6 Claims

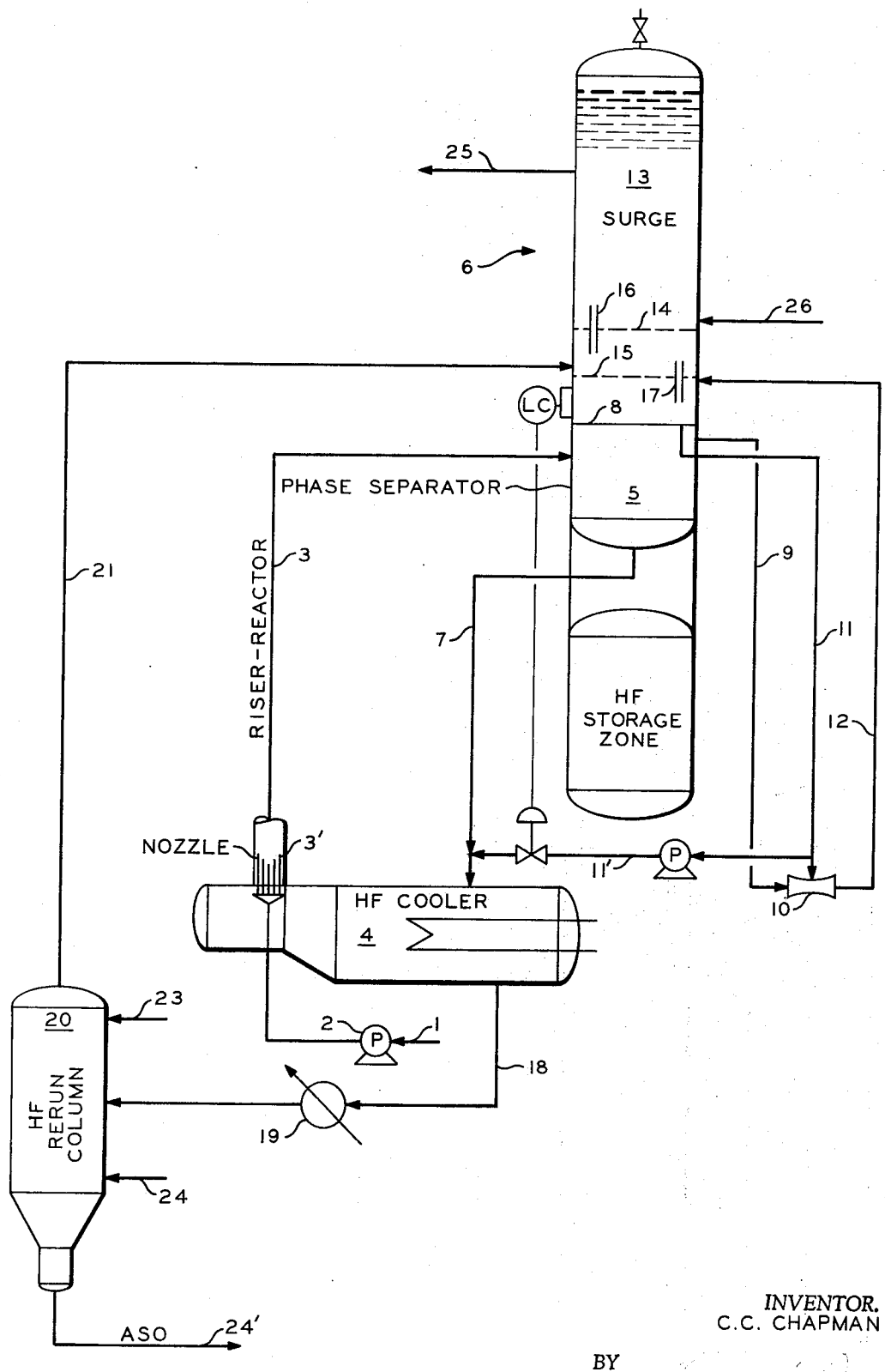

ABSTRACT OF THE DISCLOSURE

Upon separation of an alkylation effluent from an isoparaffin-olefin hydrogen fluoride alkylation into a hydrocarbon phase and an acid phase, the hydrocarbon phase, containing organic fluorides, is contacted with relatively pure HF resulting from a rerun or purification of HF in the presence of isoparaffin which acts to convert and, therefore, to reduce organic fluoride content of the HF being rerun. Additional rerun HF substantially free from or having a considerably reduced organic fluoride content can be used to further reduce organic fluoride in said hydrocarbon phase.

---

This invention relates to alkylation of hydrocarbons. In one of its aspects, it relates to the alkylation of an isoparaffin with at least one olefin in the presence of hydrogen fluoride. In a still further aspect of the invention, it relates to the reduction of organic fluorides in the operation.

In one of its concepts, the invention provides a process for the alkylation of hydrocarbons, e.g., an isoparaffin with at least one olefin in the presence of hydrogen fluoride wherein upon separation of an alkylate containing hydrocarbon phase which contains excess isoparaffin, as known, this phase is contacted with a relatively pure or purified hydrogen fluoride which has been rerun in the presence of additional isoparaffin which acts to reduce the organic fluoride content of the HF being rerun. In another concept, of the invention, it provides a process as described wherein the thus contacted hydrocarbon phase is further contacted with additional HF to further reduce the organic fluoride therein. In still another concept of the invention, it provides a process in which alkylate containing effluent is passed to a zone in which an acid phase is separated therefrom and wherein rerun HF acid, which has been rerun as herein described, is taken from a zone above the separation zone in which the acid is separated from the alkylate containing effluent and is admixed with the alkylate effluent. In a further concept of the invention, it provides for such zones in juxtaposition and under relative pressure such that the hydrocarbon phase is at a pressure sufficient to motivate an eductor so that the eductor will draw or suck rerun HF from the other of said zone, the intermingled rerun acid or HF and the hydrocarbon phase forming an emulsion which is discharged into said other zone.

It has now occurred to me to rerun an HF catalyst containing organic fluorides in the presence of isoparaffin, e.g., isobutane and/or isopentane and to use the thus relatively pure or purified rerun HF to contact separated alkylate containing hydrocarbon phase resulting from the HF alkylation of an isoparaffin with at least one olefin. Further, it has occurred to me to so arrange zones in juxtaposition that the pressure in one of them in which hydrocarbon phase is separated from the alkylation reaction effluent will be such as to serve to motivate an eductor zone or eductor in a manner to suck rerun HF from another zone and to discharge a mixture of hydrocarbon phase and the HF into said another zone, which is, of course, at a lower pressure. Still further, in said other zone, I can introduce additional rerun or relatively pure HF to further treat the emulsion before, after, or as it is being separated into a hydrocarbon phase containing alkylate of reduced organic fluoride content and acid which is reused as in the contacting of the hydrocarbon phase separated from the alkylation effluent at least in part and also at least in part to alkylate further isoparaffin with one olefin.

An object of the invention is to provide a process for the alkylation of hydrocarbons. Another object of the invention is to provide for the alkylation of an isoparaffin, e.g., isobutane and/or isopentane with at least one olefin selected from propylene, butylenes, amylenes, and hexenes. It is a further object of the invention to reduce organic fluoride in such an alkylation effluent as obtained herein. A further object still of the invention is to provide a process wherein alkyl fluoride resulting from the alkylation of at least one isoparaffin with ethylene in the presence of at least one higher olefin as described herein is removed from the alkylate obtained. It is another object of the invention to reduce the organic fluoride content of final yield alkylate in such a process.

Other aspects, concepts, objects and the several advantages of the invention are apparent from a study of this disclosure, the drawing and the appended claims.

According to the present invention, the HF hydrocarbon phase as from an alkylation reactor is charged to a first phase separation zone from which HF upon cooling is recycled to the reactor, as may be desired, and the hydrocarbon phase is removed and contacted as by eduction with a relatively pure HF from a second phase separation zone to which the relatively pure HF has been passed after a rerun operation in the presence of isoparaffin which acts during the rerun to convert organic fluorides therein, thus yielding an HF acid which is substantially free from organic fluorides or has a relatively low organic fluoride content. The hydrocarbon phase which has been contacted with such acid is passed to a general phase separation zone wherein it can be contacted with further quantities of rerun or relatively pure HF.

In the further phase separation zone, it is now preferred to feed the admixed HF and hydrocarbon phase separated from the alkylation effluent at one level and to introduce rerun or additional rerun HF acid at a higher level so that the hydrocarbon phase which has been admixed with relatively pure HF is mixed with additional quantities of such HF to further reduce the organic fluoride content of the hydrocarbon phase as it is being separated from the hydrogen fluoride or acid.

The invention is broadly applicable to the removal of organic fluoride or fluorides from effluent from an alkylation in which an isoparaffin is alkylated with at least one olefin.

In Ser. No. 138,991, filed Apr. 30, 1971, now U.S. Pat. No. 3,761,540 there is described and claimed a process for a process for the alkylation of at least one isoparaffin with ethylene which comprises conducting the alkylation with intimate admixture of the reactants and hydrogen fluoride alkylation catalyst in the presence of a substantial amount of a higher olefin.

The conditions of the alkylation and the rerun operation are generally well known in the art. Suffice to say that in the rerun operation there is added a sufficient isoparaffin to create those alkylation conditions, also known in the art with respect to this application, which will cause conversion of organic fluoride to additional alkylate so that the acid passing to phase separation following rerun will yield up into the hydrocarbon phase in the phase separation zone the additional alkylate thus produced. Sufficient liquid isobutane reflux and isobutane vapor for stripping are used to remove the HF from acid soluble oil contained in the system acid.

Although there is given a typical operation, set of conditions and information herein, it will be understood by one skilled in the art that wide variation and modification are possible in these conditions within the framework of the combination of steps set out and claimed.

The drawing shows one form of arrangement of zones or apparatus component parts for carrying out the invention. Generally, it will be seen that the upper portion of the apparatus comprises two independent sections, flows in and out of which will be described now.

Referring now to the drawing, hydrocarbon feed comprising an isoparaffin e.g., isobutane and at least one olefin, e.g., ethylene together with a higher molecular weight olefin, for example, propylene, butylenes, amylenes, hexenes, is fed by 1 and pump 2 into riser reactor 3 via nozzles 3′ in which alkylation takes place in the presence of hydrogen fluoride rising from 4 as known in the art. 4 is in effect a hydrogen fluoride cooler and the velocity of the hydrocarbon feed emanating from the pipes 4 in riser 3 causing intimate admixture with ensuing alkylation, the alkylate and hydrogen fluoride as well as excess isoparaffin being passed from riser reactor 3 to lower section 5 of vessel 6 in which hydrogen fluoride separates as a lower phase and is returned by 7 to HF supply 4, hydrocarbon phase, forming in the top of section 5 below solid plate 8, is passed by 9 to eductor 10 in which it is admixed intimately with hydrogen fluoride available above solid plate 8 and fed to eductor 10 by 11. Makeup HF for alkylation is passed via 11′ to conduit 7 on level control means maintaining a preselected liquid HF level on plate 8.

The respective pressures in the portions of vessel 6 are such that the hydrocarbon, which contains organic fluorides, causes the hydrogen fluoride or hydrofluoric acid catalyst to be sucked into eductor 10 forming an emulsion which passes by 12 into the lower portion of upper section 13 of vessel 6. There are shown in section 13 of vessel 6, for sake of simplicity, two perforate plates 14 and 15 with corresponding downcomers 16 and 17. A portion of the hydrogen fluoride catalyst passes from vessel 4 by 18 and heater 19 to hydrogen fluoride rerun column 20 wherein, as known in the art, the catalyst is purified. Isobutane liquid and isobutane vapor available in the process or from elsewhere are injected into the rerun column to cause conversion of organic fluoride in the acid to alkylate and, according to the invention, the rerun acid and light alkylate along with the isobutane is therefore passed by 21 to a point just above perforate plate 15. The liquid isobutane reflux is preferably introduced into the rerun column 20 at 23 and the isobutane stripping vapor is preferably introduced into the column at 24. Acid soluble oils are removed via 24′. The rerun HF and isoparaffin or isobutane entering just above plate 15 intermingles with hydrocarbon phase rising upwardly through section 13 of vessel 6. Hydrocarbon ultimately leaving vessel 6 at 25 for fractionation in known manner to recover alkylate and other hydrocarbons therefrom. The rerun HF which has been substantially freed of its organic fluoride content being of HF purity considerably greater than that in the hydrocarbons and acid mixture passing upwardly through plate 15, which will absorb therefrom or cause reaction of organic fluorides therein, according to the invention. If desired, additional HF acid which may contain some organic fluoride as from the conventional depropanizer accumulator may be introduced above plate 14 at column 26.

It will be understood by one skilled in the art studying this disclosure that there will be turbulence and, therefore, little or no settling of phases in the lower portion of section 13 of vessel 6. However, there will be formed a hydrocarbon phase in the upper portion of section 13 so that substantially all, if not all, and the bulk of the hydrogen fluoride introduced into the top of vessel 6 will emanate therefrom by 11.

TYPICAL OPERATION

| | |
|---|---|
| Phase separator (5): | |
| Pressure, p.s.i.g. | 147 |
| Temp., °F. | 100 |
| Riser-reactor (3): | |
| Pressure, p.s.i.g. | 159 |
| Temp., °F. | 100 |
| Hydrocarbon feed [1], b./d. | 20,145 |
| Composition, L.V. percent: | |
| Propylene | 2.5 |
| Propane | 4.7 |
| Isobutane | 70.7 |
| Butylenes | 3.0 |
| N-butane | 19.1 |
| Hydrocarbon to fractionation (25): | |
| Barrels per day | [2] 20,067 |
| Composition, L.V. percent: | |
| HF | 0.6 |
| Propane | 5.2 |
| Isobutane | 65.0 |
| NC₄(plus alky) | 2.92 |
| Liquid hydrocarbon to eductor (10): | |
| Barrels/day | 19,435 |
| Pressure, p.s.i.g. | 156 |
| Temp., °F. | 100 |
| HF to eductor (10): | |
| Barrels/day | 19,500 |
| Pressure, p.s.i.g. | 129 |
| Temp., °F. | 106 |
| Additional alkylate produced from alkyl fluorides: | |
| Barrels/year | 5,330 |
| Value, dollars/year | 33,000 |
| HF savings: | |
| Pounds/year | 30,000 |
| Value, dollars/year | 8,000 |
| Alumina savings: Value, dollars/year | 2,000 |

[1] Includes recycle isobutane.
[2] Includes isobutane from HF rerun and propane in the HF from the DC₃ overhead accumulator.

The invention increases alkylate production by about 5,330 barrels per year at a value of about $33,000. Also, fluoride loss is decreased by reacting out the organic fluorides. Alumina (or the like) treatment of propane and normal butane does not need treat as much as organic fluoride when employing the invention (loss to aluminum fluoride). There can be recovered 30,000 pounds per year HF at $8,000—HF which is not lost to aluminum fluoride—, and there is thus saved about $2,000 worth of alumina per year. This results in a reduction of pollution, since used alumina containing aluminum fluoride must be disposed of.

The HF alkylation reaction can be carried out in a temperature range of about 40° F. to about 150° F. and at a pressure to maintain liquid phase. The isobutane to olefin mol ratio can be about 2:1 to about 25:1. The HF to hydrocarbon volume ratio can be about 10:1 to 1:2.

Phase separator 5 is at a pressure slightly below the alkylation pressure (e.g., about 10 p.s.i. less, depending on the positions of the zones) and is at about the reactor temperature used.

Surge zone 13 is at a lower pressure than the phase separator 5, e.g., 20 to 60 p.s.i. less, so that eductor 10 will be properly actuated by the hydrocarbon liquid from zone 5 to educt the liquid HF from zone 13 from above plate 8, and mix and pass the mass (alkylation between the isoparaffin and organic fluorides occurring) via 12 into zone 13.

Reasonable variation and modification are possible within the scope of the foregoing disclosure, drawing and the appended claims to the invention, the essence of which is that there has been provided a process for reducing and recovering organic fluoride from an isoparaffin-olefin alkylate, as described therein used hydrogen fluoride catalyst is rerun in the presence of an isoparaffin under conditions to alkylate out the organic fluoride therein and thus purified or rerun catalyst is used to reduce organic fluoride in a hydrocarbon phase separated from the alkylation effluent; and there has been set forth an operation in which after said contacting of the rerun HF with the hydrocarbon phase obtained from the alkylation effluent, said phase is further contacted with additional rerun HF and still further with HF from a depropanizer operation to which the final hydrocarbon product of the invention has been submitted, there having been described in connection with the several process steps or operations an apparatus for economically effecting the same.

I claim:

1. A process for the alkylation of an isoparaffin with an olefin in the presence of HF-acid catalyst to obtain an alkylate-containing hydrocarbon substantially freed from organic fluoride which comprises passing isoparaffin, olefin HF acid catalyst into an alkylation reaction zone, therein causing alkylation of the isoparaffin with the olefin under alkylation conditions, thus obtaining an alkylation reaction effluent, passing the alkylation reaction zone effluent into a unitary vessel having a lower compartment and an upper compartment, said reaction zone effluent being passed into said lower compartment having a pressure therein which is substantially greater than the pressure in said upper compartment, in said lower compartment separating said effluent into a hyrocarbon phase containing organic fluoride and an acid phase containing organic fluoride, removing at least a portion of said acid phase from said lower compartment and passing the same to a rerun column to remove organic fluoride therefrom, passing thus purified HF-acid from said rerun column to said upper compartment, contacting said purified acid as it passes downwardly in said upper compartment with an acid and hydrocarbon admixture containing some organic fluoride, said admixture being obtained as hereinafter described, thus obtaining in said upper compartment a downwardly flowing acid mixture comprising said purified acid and acid from said admixture and an upwardly flowing hydrocarbon, separating said acid mixture as an acid phase from said hydrocarbon in said upper compartment, removing from said lower compartment with the aid of said pressure hydrocarbon phase separated therein, admixing said last-mentioned hydrocarbon phase with at least a portion of said acid phase taken from said upper compartment to convert organic fluoride into additional alkylate and to form said acid and hydrocarbon admixture which is utilized in said contacting, and removing from said upper compartment said alkylate-containing hydrocarbon substantially freed from organic fluoride.

2. A process according to claim 1 wherein there is fed to a locus above the discharge into said upper section of said admixture, additional purified hydrogen fluoride for further reaction therewith.

3. A process according to claim 1 wherein the level of acid phase in said upper compartment is controlled and said acid phase taken from said upper compartment, which is not used for admixture with said hydrocarbon phase separated in said lower compartment, is passed to said alkylation zone responsive to said level.

4. A process according to claim 1 wherein the separating of said effluent is effected in said lower compartment under said pressure sufficient to supply the hydrocarbon phase taken therefrom to motivate an eductor zone and to cause admixture of said hydrocarbon phase and said acid phase.

5. A process according to claim 4 wherein said admixture is passed from said eductor zone to said upper compartment to form said hydrocarbon and acid admixture which is utilized in said contacting.

6. A process according to claim 5 wherein the pressure in said upper compartment is sufficiently low that said admixture from said eductor zone can be discharged into said upper compartment.

References Cited

UNITED STATES PATENTS

| | | | |
|---|---|---|---|
| 3,551,515 | 12/1970 | Gentry | 260—683.48 |
| 3,171,865 | 3/1965 | Davison et al. | 260—683.48 |
| 3,478,125 | 11/1969 | Chapman | 260—683.48 |
| 3,204,010 | 8/1965 | Van Pool | 260—683.48 |
| 3,204,011 | 8/1965 | Hettick et al. | 260—683.48 |
| 3,211,802 | 10/1965 | Dixon et al. | 260—683.45 |

DELBERT E. GANTZ, Primary Examiner

G. J. CRASANAKIS, Assistant Examiner

U.S. Cl. X.R.

260—683.42